US007895381B2

(12) United States Patent
Weng

(10) Patent No.: US 7,895,381 B2
(45) Date of Patent: Feb. 22, 2011

(54) DATA ACCESSING SYSTEM

(75) Inventor: Chih-Hao Weng, Tainan County (TW)

(73) Assignee: Himax Media Solutions, Inc., Fonghua Village, Sinshih Township, Tainan County (TW)

( * ) Notice: Subject to any disclaimer, the term of this patent is extended or adjusted under 35 U.S.C. 154(b) by 88 days.

(21) Appl. No.: 12/371,632

(22) Filed: Feb. 16, 2009

(65) Prior Publication Data

US 2010/0211710 A1 Aug. 19, 2010

(51) Int. Cl.
*G06F 13/14* (2006.01)
*G06F 3/00* (2006.01)

(52) U.S. Cl. .......................... 710/110; 710/38; 710/316

(58) Field of Classification Search ................. 710/110, 710/316–317, 38

See application file for complete search history.

(56) References Cited

U.S. PATENT DOCUMENTS 4,774,652 A * 9/1988 Dhuey et al. ................ 711/202
5,148,539 A * 9/1992 Enomoto et al. ............ 710/307
5,659,782 A * 8/1997 Senter et al. .................. 712/23
5,911,053 A * 6/1999 Pawlowski et al. .......... 710/307
5,974,493 A * 10/1999 Okumura et al. ............ 710/307
6,208,275 B1 * 3/2001 Lovell ........................ 341/100
6,317,819 B1 * 11/2001 Morton ........................ 712/22
6,381,664 B1 * 4/2002 Nishtala et al. ............. 710/305
6,735,661 B2 * 5/2004 Gelke et al. ................. 710/307
6,816,921 B2 * 11/2004 Jahnke et al. ................. 710/22
6,857,035 B1 * 2/2005 Pritchard et al. ............ 710/110
6,900,746 B1 * 5/2005 Lovell ........................ 341/100
7,000,045 B2 * 2/2006 Holm et al. ................. 710/110
7,145,903 B2 * 12/2006 Gutierrez .................... 370/362
7,430,631 B2 * 9/2008 Van Berkel et al. ......... 711/101
7,532,636 B2 * 5/2009 Yap et al. .................... 370/423
7,558,895 B2 * 7/2009 Bruce ......................... 710/110
2008/0034139 A1 * 2/2008 Han et al. ................... 710/110
2009/0254735 A1 * 10/2009 Col et al. .................... 712/208

* cited by examiner

*Primary Examiner*—Ryan M Stiglic
*Assistant Examiner*—Trisha Vu
(74) *Attorney, Agent, or Firm*—Winston Hsu; Scott Margo

(57) ABSTRACT

A data accessing system bridges a first master device and a second master device to a first slave device and a second slave device. The data accessing system includes a register, a first multiplexer, a second multiplexer and a control unit. The amount of data that the first master device can process each cycle is less than which of the second slave device. The data accessing system can solve the problem when the first master device writes data to the second slave device via merging two different data. Also, the data accessing system can solve the problem when the first master device reads data to the second slave device via extracting part of the data.

5 Claims, 3 Drawing Sheets

DATA ACCESSING SYSTEM

BACKGROUND OF THE INVENTION

1. Field of the Invention

The present invention relates to a data accessing method and system, and particularly relates to a system including master and slave devices.

2. Description of the Prior Art

FIG. 1 is a block diagram illustrating prior art writing operations between master devices and slave devices. As shown in FIG. 1, master devices include a master device 101 and a master device 103, and slave devices include a slave device 105 and a slave device 107. The master device 101 includes a processor that can process less data each process cycle (for example, 24 bit), and the master device 103 includes a processor that can process more data each process cycle (for example, 32 bit). Also, the slave device 105 can access less data each process cycle (for example, 24 bit), and the slave device 107 can access more data each process cycle (for example, 32 bit). The master device 101 and the master device 103 can respectively write data to the slave device 105 and the slave device 107, as indicated by the arrows shown in FIG. 1. However, since the empty space of the slave device can not be filled with blank data or null data and all data received by the slave device must be data having meanings, some problem will happen if a master device writes data less than the data amount that a slave device can receive each process cycle to the slave device. For example, the master device 101 writes 24 bit data to the slave device 107.

FIG. 2 is a block diagram illustrating prior art reading operations between master devices and slave devices. Similar with FIG. 1, master devices in FIG. 2 include a master device 201 (24 bit) and a master device 203 (32 bit), and slave devices include a slave device 205 (24 bit) and a slave device 207 (32 bit). The master device 201 and the master device 203 can respectively read data from the slave device 205 and the slave device 207, as indicated by the arrows shown in FIG. 2. However, a problem will develop if a master device reads more data than the data amount the master device can process each process cycle. For example, the master device 201 reads 32 bits data from the slave device 207.

Therefore, a new data accessing method and a system utilizing the data accessing method is needed to solve the above-mentioned problems.

SUMMARY OF THE INVENTION

One objective of the present invention is to provide a data accessing method and system to overcome the above-mentioned problems.

One embodiment of the present invention discloses a data accessing system for bridging a first master device and a second master device to a first slave device and a second slave device. The data accessing system includes: a register; a first multiplexer, for outputting one of outputs from the first master device and the second master device to both the first slave device and the second slave device, according to a controlling signal; a second multiplexer, for outputting one of outputs from the first slave device and the second slave device to both the first master device and the second master device, according to the controlling signal; a control unit, for generating the control signal and for performing in a first mode, if the first master device generates a first data and a second data to the second slave device in order, including: extracting part of the first data, controlling the register to register the extracted part of the first data, merging the registered part of the first data and the second data to generate a merged data as the output of the first multiplexer; and writing the merged data to the second slave device; wherein the control unit further performs in a second mode, if the first master device reads a data from the second slave device: extracting part of the data, including: controlling the register to register part of the data, controlling the second multiplexer to output the un-registered part of the data and registered part of the data in order; and controlling the first master device to read un-registered part of the data and the registered part of the data in order.

According above mentioned description, new data accessing method and a system utilizing the data accessing method can be acquired. By this way, the prior art problem described in FIG. 1 and FIG. 2 can be avoided.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
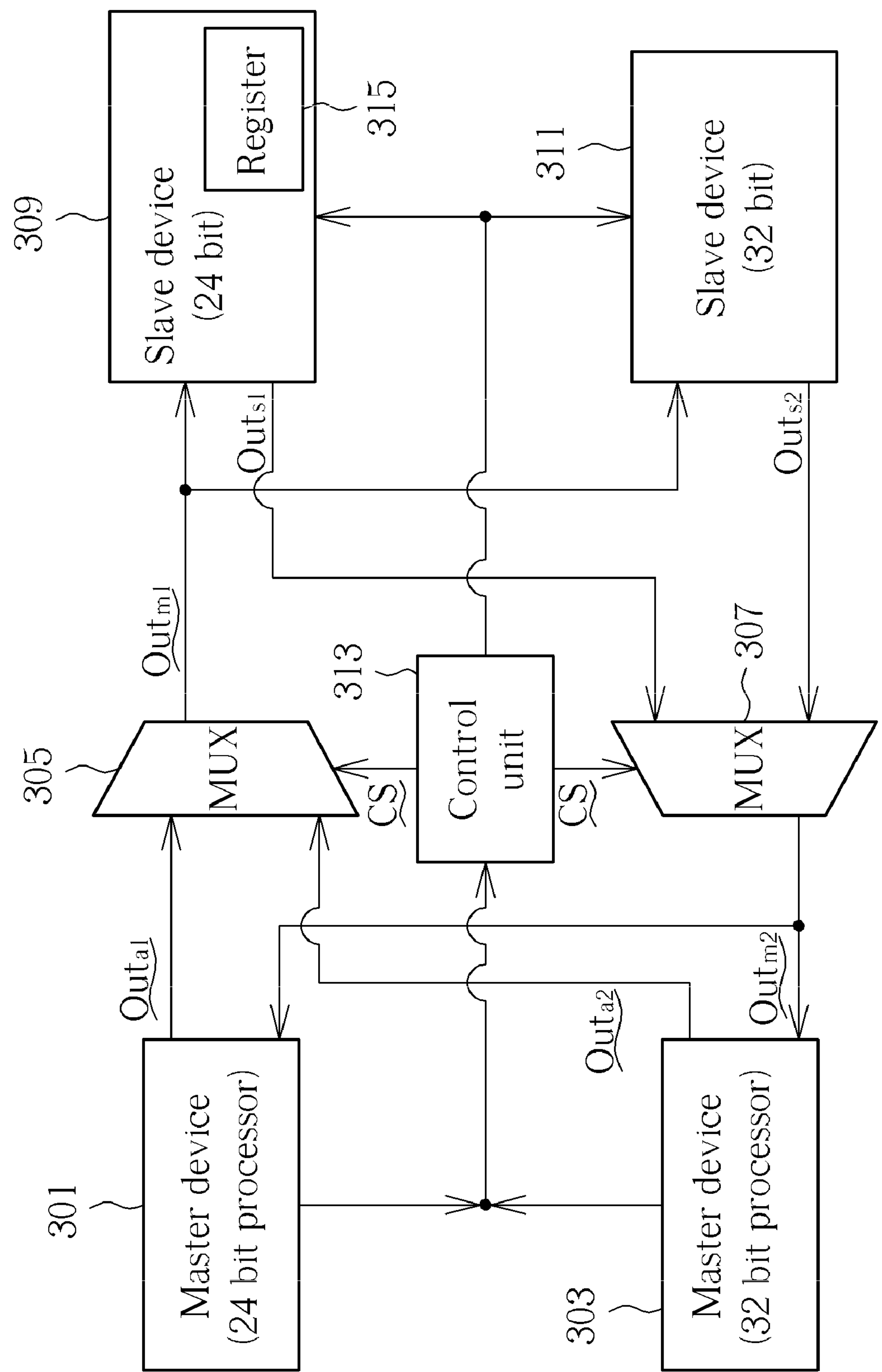
FIG. 3 is a data accessing system according to an embodiment of the present invention.

FIG. 3 is a data accessing system 300 according to an embodiment of the present invention. As shown in FIG. 3, the data accessing system 300 includes a master device 301 (24 bit), a master device 303 (32 bit), multiplexers 305, 307, a slave device 309 (24 bit), a slave device 311 (32 bit), a control unit 313 and a register 315. The master devices 301 and 303 can be processors. Please note that the devices and structures shown in FIG. 3 are only for example and do not mean to limit the scope of the present invention. Also, the multiplexers 305, 307, the control unit 313 and the register 315 can be regarded as a bus system according to an embodiment of the present invention, for bridging a master device 301 and a master device 303 to a slave device 309 and a slave device 311.

Please refer to the master device 301, the master device 303, the multiplexers 305, the slave device 309, the slave device 311, the control unit 313 and the register 315. These devices perform writing operations of the data accessing system 300. The master device 301 or a master device 303 will send information to inform the controller 313 when the master device 301 or the master device 303 requires sending data $Out_{a1}$ or $Out_{a2}$ to the slave device 309 or the slave device 311. The control unit 313 will send a control signal CS to select one of the data $Out_{a1}$ or $Out_{a2}$ as the output data $Out_{m1}$ of the multiplexer 305 according to the requirement of the master device 301 or the master device 303. The control unit 313 further controls one of the slave device 309 and the slave device 311 to receive the output data $Out_{m1}$ of the multiplexer 305, and controls the other one of the slave device 309 and the slave device 311 to reject the output data $Out_{m1}$ of the multiplexer 305. In one embodiment, if the data $Out_{a1}$ is written to the slave device 309, or the data $Out_{a2}$ is output to the slave device 309, normal written operations are performed.

Figure 1:
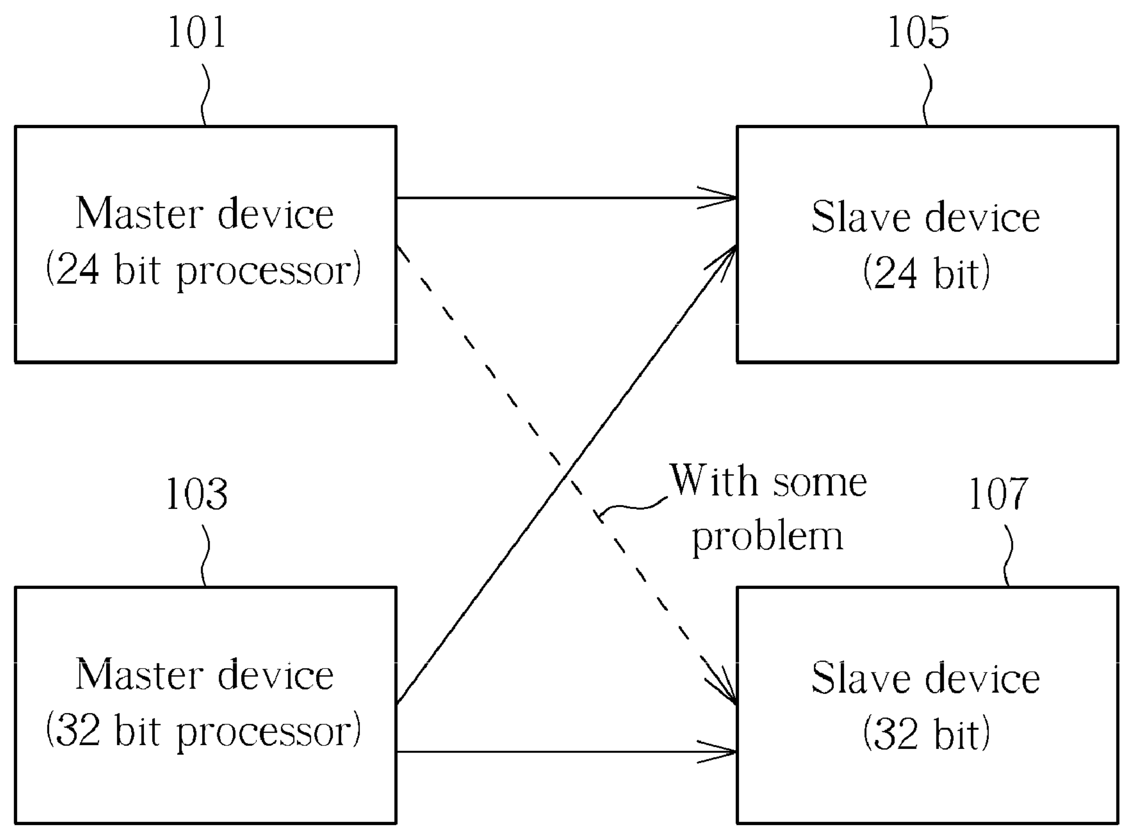
FIG. 1 is a block diagram illustrating prior art writing operations between master devices and slave devices.

However, if data $Out_{a1}$ (24 bit) is written to the slave device 311 (32 bit), the problem described in FIG. 1 will happen, therefore a special data writing method according to the present invention is performed. In one embodiment, the master device 301 generates a requirement of writing data to the slave device 311, and the master device 301 generates a first output data $Out_{a1}$ (24 bit) and a second output data $Out_{a1}$ (24 bit) to the slave device 311 in order. The control unit 313 performs that 8 bits of the first output data $Out_{a1}$ is registered in the register 315 in the slave device 309. After that, the second output data $Out_{a1}$ that is output after the first output data $Out_{a1}$ will be merged with the 8 bit registered data to form a 32 bit merged data, and the multiplexer 305 outputs the 32 bit merged data according to a control signal CS. Then the 32 bit merged data is written to the slave device 311. By this way, the slave device 311 will have no empty space and the problem described in FIG. 1 can be avoided. The 8 bit registered data can be LSB (Least significant bit) or MSB (Most significant bit) of the first output data $Out_{a1}$, but this does not mean to limit it to these bits. Besides, it should be noted the register 105 is not limited to be included in the slave device 309 and the register 105 can be independent from the slave device 309. Furthermore, the slave devices and the master devices are not limited to 24 bit and 32 bit, and the registered data is not limited to 8 bit.

Therefore, the writing operation of the data accessing system 300 can be summarized as follows: Utilize a first electronic device (for example, master device 301) to provide a first data (for example, first output data $Out_{a1}$). Extract and register part of the first data (for example, 8 bits of the first output data $Out_{a1}$). Provide a second data (for example, second output data $Out_{a1}$ generated after the first output data $Out_{a1}$). Merge the registered part of the first data and the second data to generate a merged data. Write the merged data to a second electronic device (for example, slave device 311). These operation steps can also be regarded as a data writing method according to an embodiment of the present invention.

Besides the writing operations, the reading operations of the data accessing system 300 are described in the following description. Please refer to the master device 301, the master device 303, the multiplexer 307, the slave device 309, the slave device 311, the control unit 313 and the register 315. These devices perform reading operations of the data accessing system 300. The master device 301 or a master device 303 will send information to inform the controller 313 when the master device 301 or the master device 303 requires reading data $Out_{s1}$, or $Out_{s2}$ from the slave device 309 or the slave device 311. The control unit 313 will send a control signal CS to the multiplexer 307 for selecting one of the data $Out_{s1}$ or $Out_{s2}$ as the output data $Out_{m2}$ of the multiplexer 307. The control unit 313 further controls one of the master device 301 and the master device 303 to receive the output data $Out_{m2}$ of the multiplexer 307, and controls the other one of the master device 301 and the master device 303 to reject the output data $Out_{m2}$ of the multiplexer 307. In one embodiment, if the master device 301 reads data $Out_{s1}$, or the master device 303 reads data $Out_{s1}$ or $Out_{s2}$, normal reading operations are performed.

Figure 2:
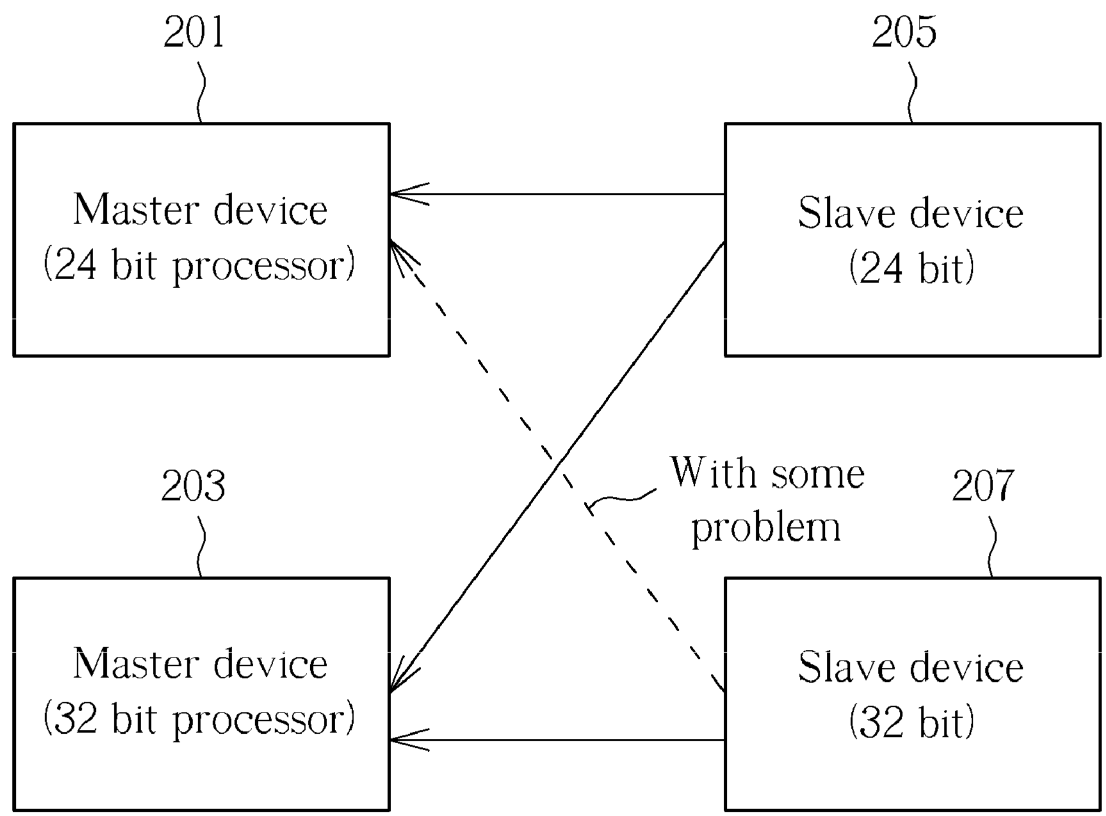
FIG. 2 is a block diagram illustrating prior art reading operations between master devices and slave devices.

However, if the master device 301 (24 bit) reads the data $Out_{s2}$ (32 bit), the problem described in FIG. 2 will happen, therefore a special reading method according to the present invention is performed. In one embodiment, the master device 301 (24 bit) generates a requirement of reading a data $Out_{s2}$ (32 bit) from the second slave device to the control unit 313. The control unit 313 performs that 8 bits of the data $Out_{s2}$ is extracted and registered in the register 105 in the slave device 309. After that, the multiplexer 307 outputs the un-registered 24 bit data of the data $Out_{s2}$ and the registered 8 bit data of the data $Out_{s2}$ in order according to a control signal CS. The master device 301 reads the un-registered 24 bit data of the data $Out_{s2}$ first. Then the master device 301 reads the registered 8 bit data, and the empty space of the master device 301 can be filled with blank data. By this way, the problem described in FIG. 2 can be avoided. Besides, it should be noted the register 315 is not limited to being included in the slave device 309 and there can be independent from the slave device 309. Furthermore, the slave devices and the master device are not limited to 24 bit and 32 bit, and the registered data is not limited to 8 bit.

Therefore, the reading operation of the data accessing system 300 can be summarized as follows: Read a data (for example, the master device 301 reads 32 bit data from the slave device 311). Register part of the data (for example, 8 bit data of the 32 bit data from the slave device 311). Read un-registered part of the data (for example, the un-registered 24 bit data of the 32 bit data from the slave device 311). Read the registered part of the data. These operation steps can also be regarded as a data reading method according to an embodiment of the present invention.

According to the above mentioned description, a new data accessing method and a system utilizing the data accessing method can be acquired. By this way, the prior art problem described in FIG. 1 and FIG. 2 can be avoided.

Those skilled in the art will readily observe that numerous modifications and alterations of the device and method may be made while retaining the teachings of the invention.

What is claimed is:

1. A data accessing system for bridging a first master device and a second master device to a first slave device and a second slave device, wherein the first master device and the first slave device can process N bit data each process cycle, and the second master device and the second slave device can process M bit data each process cycle, where N is smaller than M, comprising:

a register;

a first multiplexer, for outputting one of outputs from the first master device and the second master device to both the first slave device and the second slave device, according to a controlling signal;

a second multiplexer, for outputting one of outputs from the first slave device and the second slave device to both the first master device and the second master device, according to the controlling signal;

a control unit, for generating the control signal and for performing in a first mode, if the first master device generates a first data and a second data to the second slave device in order, including: extracting part of the first data, controlling the register to register the extracted part of the first data, merging the registered part of the first data and the second data to generate a merged data as the output of the first multiplexer; and writing the merged data to the second slave device;

wherein the control unit further performs in a second mode, if the first master device reads a data from the second slave device, including: extracting part of the data, controlling the register to register part of the data, controlling the second multiplexer to output the un-registered part of the data and registered part of the data in order; and controlling the first master device to read un-registered part of the data and the registered part of the data in order;

where the control unit controls one of the first master device and the second master device to receive output from the second multiplexer, and controls the other one of the first master device and the second master device to reject the output from the multiplexer, while in the second mode.

2. The data accessing system of claim 1, wherein the control unit further controls one of the first slave device and the second slave device to receive output from the first multiplexer, and controls the other one of the first slave device and the second slave device to reject the output from the first multiplexer, while in the first mode.

3. The data accessing system of claim 1, wherein the control unit extracts LSB (Least significant bit) or MSB (Most significant bit) for a predetermined number of bits of the first data.

4. The data accessing system of claim 1, wherein the register is merged to the first slave device or the second slave device.

5. The data accessing system of claim 1, wherein the first master device and the second master device are processors.

* * * * *